United States Patent
Li et al.

(10) Patent No.: US 10,121,090 B2
(45) Date of Patent: Nov. 6, 2018

(54) OBJECT DETECTION USING BINARY CODED IMAGES AND MULTI-STAGE CASCADE CLASSIFIERS

(71) Applicant: Intel Corporation, Santa Clara, CA (US)

(72) Inventors: Jianguo Li, Beijing (CN); Ke Chen, Cupertino, CA (US); Yi-Jen Chiu, San Jose, CA (US); Chen Wang, Beijing (CN); Ya-Ti Peng, Santa Clara, CA (US); Bin Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 15/125,027

(22) PCT Filed: Apr. 11, 2014

(86) PCT No.: PCT/CN2014/075165
§ 371 (c)(1),
(2) Date: Sep. 9, 2016

(87) PCT Pub. No.: WO2015/154305
PCT Pub. Date: Oct. 15, 2015

(65) Prior Publication Data
US 2017/0039444 A1   Feb. 9, 2017

(51) Int. Cl.
*G06K 9/00*       (2006.01)
*G06K 9/46*       (2006.01)
*G06T 7/73*       (2017.01)

(52) U.S. Cl.
CPC ......... *G06K 9/4604* (2013.01); *G06K 9/4647* (2013.01); *G06T 7/73* (2017.01); *G06T 2207/10004* (2013.01)

(58) Field of Classification Search
None
See application file for complete search history.

(56) References Cited

U.S. PATENT DOCUMENTS

| 7,050,639 B1 | 5/2006 | Barnes et al. |
| 7,319,797 B2 | 1/2008 | Hung |
| 8,384,122 B1 | 2/2013 | Hu et al. |

(Continued)

FOREIGN PATENT DOCUMENTS

| CN | 100357958 | 12/2007 |
| CN | 101369315 | 2/2009 |

(Continued)

OTHER PUBLICATIONS

International Search Report & Written Opinion, dated Dec. 5, 2014, for PCT Patent Application No. PCT/CN14/75165.

(Continued)

*Primary Examiner* — Idowu O Osifade
(74) *Attorney, Agent, or Firm* — Green, Howard & Mughal LLP.

(57) ABSTRACT

Techniques related to object detection using directional filtering are discussed. Such techniques may include determining directional weighted averages for pixels of an input image, generating a feature representation of the input image based on the directional weighted averages, and performing object detection by applying a multi-stage cascade classifier to the feature representation.

19 Claims, 9 Drawing Sheets

(56) References Cited

U.S. PATENT DOCUMENTS

| | | |
|---|---|---|
| 2005/0201596 A1 | 9/2005 | Hwang et al. |
| 2007/0014482 A1 | 1/2007 | Kim et al. |
| 2011/0012757 A1 | 1/2011 | Pashel |
| 2011/0084319 A1 | 4/2011 | Zhu et al. |
| 2011/0293173 A1 | 12/2011 | Porikli et al. |
| 2011/0303950 A1 | 12/2011 | Lauer et al. |
| 2012/0043607 A1 | 2/2012 | Luisier et al. |
| 2013/0060765 A1 | 3/2013 | Lin et al. |
| 2013/0223683 A1 | 8/2013 | Jiang et al. |
| 2013/0272575 A1 | 10/2013 | Li et al. |
| 2014/0201126 A1* | 7/2014 | Zadeh .................... G06K 9/627 706/52 |
| 2015/0003743 A1 | 1/2015 | Nosaka |

FOREIGN PATENT DOCUMENTS

| | | |
|---|---|---|
| CN | 101520850 | 9/2009 |
| CN | 1989525 | 5/2010 |
| CN | 102281388 | 12/2011 |
| TW | 200704179 | 1/2007 |
| WO | 2013063765 | 5/2013 |

OTHER PUBLICATIONS

International Search Report and Written Opinion, dated Dec. 22, 2014, for PCT Patent Application No. PCT/US14/32059.
Non-Final Office Action, dated Aug. 26, 2016, for U.S. Appl. No. 14/567,147.
Fröba, B. et al., "Face Detection with the Modified Census Transform", Proceedings of the 6th IEEE Int'l conf on Automatic Face and Gesture Recognition (FGR'04), 2004, IEEE, 6 pages.
Jin, H. et al., "Face Detection Using Improved LBP Under Bayesian Framework", Proceedings of the 3rd Int'l Conf on Image and Graphics (ICIG'04), 2004, IEEE, 4 pages.
Jun et al., "Robust Face Detection Using Local Gradient Patterns and Evidence Accumulation", Pattern Recognition 45, vol. 45, Iss. 9, Sep. 2012, p. 3304-3316.
Li, J. et al., "Face Detection using SURF Cascade", 2011 IEEE Int'l Conf on Computer Vision Workshops, 2011, IEEE, pp. 2183-2190 (8 pages).
Viola, P. et al., "Robust Real-time Object Detection", Cambridge Research Laboratory Technical Report Series, CRL 2001/Feb. 1, 2001, 30 pages.
International Preliminary Report on Patentability, dated Oct. 20, 2016, for PCT Patent Application No. PCT/CN2014/075165.
Notice of Allowance, dated Dec. 14, 2016, for U.S. Appl. No. 14/567,147.
Search Report, dated Oct. 17, 2016, for Taiwanese Patent Application No. 104107271.
European Search Report dated Jan. 24, 2018 for EP Patent Application No. EP14889031.
Bay, H. et al., "Speeded-Up Robust Features (SURF)", Computer Vision and Image Understanding, Academic Press, US, vol. 110. No. 3, Jun. 1, 2008, pp. 346-359, XP022652944.
Huang, D. et al., "Local Binary Patterns and Its Application to Facial Image Analysis: A Survey", IEEE Transactions on Systems, Man, and Cybernetics: Part C: Applications and Reviews, IEEE Service Center, Piscataway, NJ, US, vol. 41, No. 6, Nov. 1, 2011, pp. 765-781, XP011363204.
Lienhart, R. et al., "Empirical Analysis of Detection Cascades of Boosted Classifiers for Rapid Object Detection", Electronic Publishing, Artistic Imaging, and Digital Typography; Springer Verlag, DE, vol. 2781, Jan. 1, 2013, pp. 297-304, XP002374203.
Roy, A. et al., "Haar Local Binary Pattern Feature or Fast Illumination Invariant Face Detection", Computer Vision Using Local Binary Patterns, Jun. 22, 2011, pp. 1-12, XP055443196.
Viola, P. et al., "Rapid Object Detection using a Boosted Cascade of Simple Features", Proceedings of the 2001 IEEE Computer Society Conference on Computer Vision and Pattern Recognition. CVPR 2001, vol. 1, Jan. 1, 2001, pp. I-511, XP055141503 *Integration of Multiple Detections: p. 517*.
Wu, B. et al., "Fast Rotation Invariant multi-View Face Detection Based on Real Adaboost", Proceedings 6th IEEE Int'l Conference on Automatic Face and Gesture Recognition, 2004. Piscataway, NJ, May 17, 2004, pp. 79-84, XP010949414.
Zhang, H. et al., "Object Detection using Spatial Histogram Features", Image and Vision Computing, Elsevier, Guildford, GB, vol. 24, No. 4, Apr. 1, 2006, pp. 327-341, XP027994846 *section 2, step 3; figure 1*.
Zhang, L. et al., "Face Detection Based on Mulit-Block LBP Representation", Lecture Notes in Computer Science, vol. 4642, Jan. 1, 2007, pp. 11-18, XP055200341, Berlin, Heidelberg, ISSN: 0302-9743.
Zhang, W. "Multi-Resolution Histograms of Local Variation Patterns (MHLVP) for Robust Face Recognition", Audio-and Video-based Biometric Person Authentication; Springer-Verlag, Berlin/Heidelberg, pp. 937-944, XP019013357.
Zhen, L. et al., "Discriminant image filter learning for face recognition with local binary pattern like representation", 2012 IEEE Conference on Computer Vision and Pattern Recognition, Jun. 16, 2012, pp. 2512-2517, Audio-and Video-based Biometric Person Authentication; Springer-Verlag, Berlin/Heidelberg, pp. 937-944.
Official first action dated May 12, 2017 for Taiwan Patent Application No. 104107271.

* cited by examiner

OBJECT DETECTION USING BINARY CODED IMAGES AND MULTI-STAGE CASCADE CLASSIFIERS

CLAIM OF PRIORITY

This Application is a National Stage Entry of, and claims priority to, PCT Application No. PCT/CN2014/075165, filed on 4 Apr. 2015 and titled "OBJECT DETECTION USING DIRECTIONAL FILTERING", which is incorporated by reference in its entirety for all purposes.

BACKGROUND

Object detection may be used to determine whether and/or where in an image a certain object such as a human face, a human body, an automobile, or the like appears. For example, face detection may be used in human-computer interaction, photo album management, biometrics, video surveillance, automatic focus in camera imaging, image or video search and retrieval, and the like.

Several object detection (e.g., face detection) solutions have been proposed including a Viola-Jones framework that may use Haar-like features and a decision tree weak classifier scheme and a SURF-like feature cascade technique that may use SURF-like features and a cascade classifier scheme. Although SURF-like techniques may have improved upon the Viola-Jones framework, implementations may not be suitable to real-time processing of higher resolution images such as high definition (HD), Full-HD (e.g., 1080p), or 4K resolution (e.g., content having horizontal resolution on the order of 4,000 pixels) using state of the art computing systems. Furthermore, such implementations may require large portions of memory (e.g., up to 32 times the input image size) during detection. Therefore, implementations may not be suitable to mobile devices or deep embedded devices or the like.

As such, existing techniques do not provide object detection for real-time processing on higher resolution images and/or solutions for mobile devices or deep embedded devices. Such problems may become critical as object detection becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
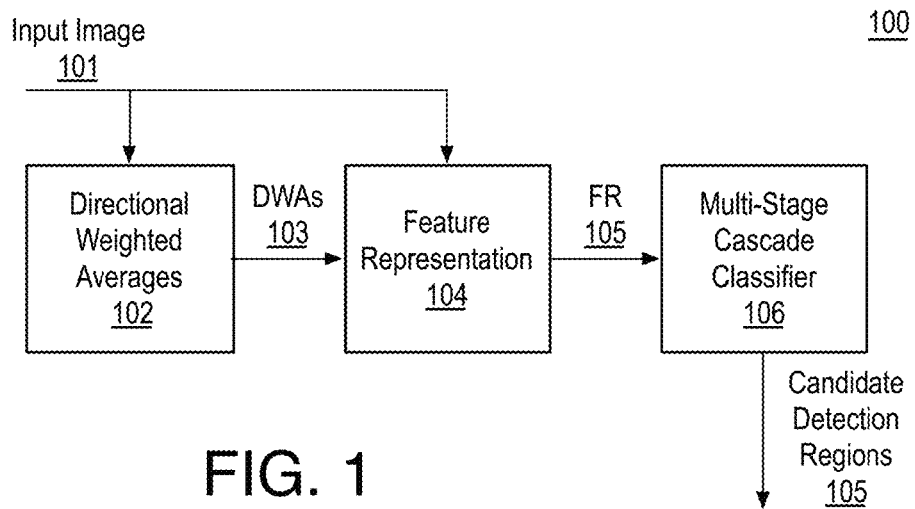
FIG. 1 is an illustrative diagram of an example system for providing object detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to object detection using directional filtering.

As described above, it may be advantageous to provide object detection (e.g., face detection) in real-time and/or on higher resolution images. Furthermore, it may be advantageous to provide such object detection in implementations with limited memory resources such as on mobile devices or deep embedded devices (e.g., on wearable devices such as glasses or watches or in robot systems) or the like. Such object detection, image signal processing, or visual analytics may provide enhanced user experiences.

In some embodiments, object detection may include determining directional weighted averages (e.g., providing directional weighted filtering) for individual pixels of an input image (e.g., some or all of the pixels of an input image) based on pixel values of neighbor pixels of each of the individual pixels and weights associated with locations of each of the neighbors pixels relative to the individual pixels. For example, a directional weighted average for a pixel may be determined based on a weighted average of pixel values of multiple pixels neighboring (e.g., within a window or neighborhood of the pixel) the pixel. Such a technique may be applied to individual pixels of the input image to generate directional weighted averages. A feature representation of the input image may be determined based on the directional weighted averages. In various embodiments, the feature representation may include a binary coded image, Haar-like features, or SURF-like features. To generate a feature representation including a binary coded image, for a pixel of the input image, the pixel values of the pixels neighboring the pixel (e.g., the neighbors used to generate the pixel's directional weighted average) may each be compared to the pixel's directional weighted average and a value of 1 or 0 may be assigned to each neighboring pixel based on the comparison. For example, a value of 1 may be assigned if the neighboring pixel value is greater than the pixel's directional weighted average and otherwise a 0 may be assigned. The binary coded representation for the pixel may then be determined based on the assigned values (e.g., by arranging the assigned 1s or 0s in an order).

In some examples, object detection may be performed based on the feature representation (e.g., Haar-like, SURF-like, or binary coded image) using a multi-stage cascade classifier. For example, a region (e.g., scan window) of the input image may be evaluated at multiple stages such that if a region fails any stage it is rejected and if it passes all stages it is retained (e.g., the location and size of the region is retained) as a candidate region for containing the object. The multi-stage classifier may be applied to many regions of the input image and multiple scaled images of the input image may be evaluated to locate candidate region(s).

In various embodiments, the multi-stage cascade classifier may include stages where weak classifiers determined based on the feature representation are compared to a predetermined threshold. For example, the weak classifiers may be summed and compared to a predetermined threshold. As discussed, if a region fails any stage it may be rejected and if it passes a stage it may be transferred to a next stage for evaluation. If the region passes all stages it is retained as a candidate region. For example, the weak classifiers may include logistic regression based classifiers or Bayesian classifiers implemented via look up tables or the like. In an embodiment, applying a stage includes determining, for target positions in the region, a plurality of differences between probabilities the target positions include an object feature and probabilities the target positions do not include an object feature. The differences may then be summed and compared to a threshold to determine whether the region passes or fails the stage. Subsequent stages may include, for example, more target positions, different target positions, or a more stringent threshold or the like.

FIG. 1 is an illustrative diagram of an example system 100 for providing object detection, arranged in accordance with at least some implementations of the present disclosure. As shown in FIG. 1, system 100 may include a directional weighted averages module 102, a feature representation module 104, and a multi-stage cascade classifier module 106. Also as shown, directional weighted averages module 102 may receive an input image 101. Input image 101 may include any suitable image or image file such as, for example, a real-time image, a decoded image, a captured image (e.g., via a camera or the like), a rendered image, an image from a sequence of video images or frames, an image retrieved from memory, or the like. In some examples, input image may be a video graphics array (VGA), high definition (HD), Full-HD (e.g., 1080p), or 4K resolution image or video frame. In an embodiment, input image 101 is a raw image. In some examples, input image 101 may be a color image. In an embodiment, input image 101 is a gray-scale image. As is discussed further herein, in some examples, input image 101 may be a resized (e.g., scaled) image based on an input or target image such that the operations discussed with respect to system 100 may be repeated for various scaled images of an input image to detect object candidate regions.

As shown, directional weighted averages module 102 may process input image 101 to generate directional weighted averages (DWAs) 103 based on input image 101. For example, directional weighted averages module 102 may, for individual pixels of input image 101, determine directional weighted averages 103 based on pixel values of neighboring pixel values of each of the individual pixels and weights associated with locations of the neighboring pixel values relative to the individual pixels. For example, the neighboring pixels may be neighboring pixels in a pattern around each of the individual pixels. As is discussed further herein, a weighted average of the neighboring pixel values based on their weights may be determined for the individual pixel and such directional weighted averages for some or all of the pixels of input image 101 may determine directional weighted averages 103.

FIGS. 2A, 2B, 2C, 2D, and 2E illustrate neighboring pixels in example patterns around an individual pixel 201, arranged in accordance with at least some implementations of the present disclosure.

Figure 2A:
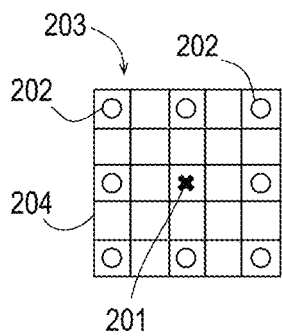
FIGS. 2A, 2B, 2C, 2D, and 2E illustrate neighboring pixels in example patterns around an individual pixel.

As shown in FIG. 2A, neighboring pixels 202 (illustrated via circles) may be in an example pattern 203 within a window 204 around individual pixel 201 (illustrated via an X). As shown, pattern 203 may include neighboring pixels 202 (in FIGS. 2A-2E only some neighboring pixels are labeled for the sake of clarity of presentation) arranged at the corners and centered along the edges of 5 by 5 pixel window 204 and pattern 203 may include 8 neighboring pixels 202 of individual pixel 201. For example, each neighboring pixel 202 has 1 pixel between itself and individual pixel 201 (e.g., oriented horizontally, vertically, or diagonally) in pattern 203. In another example (not illustrated), window 204 may be 7 by 7 pixels and neighboring pixels 202 may be arranged at the corners and centered along the edges of a 7 by 7 window and each neighboring pixel 202 may have 2 pixels between itself and individual pixel (e.g., oriented horizontally, vertically, or diagonally).

Figure 2B:
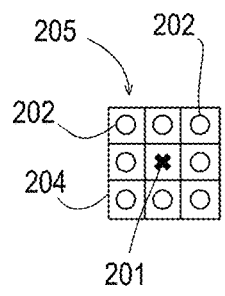

As shown in FIG. 2B, neighboring pixels 202 may be in an example pattern 205 within window 204 around individual pixel 201. As shown, pattern 205 may include neighboring pixels 202 arranged immediately around individual pixel 201 and within a 3 by 3 pixel window 204. Furthermore, as shown, pattern 205 may include 8 neighboring pixels 202 of individual pixel 201. In another example (not illustrated), window 204 may be 5 by 5 pixels, neighboring pixels 202 may be arranged immediately around individual pixel 201 in two layers (one layer immediately around individual pixel 201 and a second layer immediately around the first layer) and the pattern may include 24 neighboring pixels.

Figure 2C:
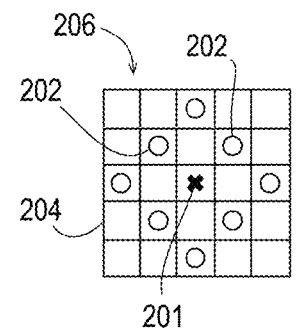

As shown in FIG. 2C, neighboring pixels 202 may be in an example pattern 206 within window 204 around individual pixel 201. As shown, pattern 206 may include neighboring pixels 202 arranged in a diamond pattern around individual pixel 201 within a 5 by 5 pixel window 204. Furthermore, pattern 206 may include 8 neighboring pixels 202 of individual pixel 201. For example, the diamond pattern may extend between four neighboring pixels 202 centered along the top, sides and bottom edges of window 204 as shown. In another example (not illustrated), window 204 may be 7 by 7 pixels and neighboring pixels 202 may be arranged in a diamond pattern around individual pixel 201 that extends between four neighboring pixels centered along the top, sides and bottom edges of window 204 such that the diamond pattern may include 12 neighboring pixels. In yet another example (not illustrated), window 204 may be 3 by 3 pixels and neighboring pixels 202 may be arranged in a diamond pattern around individual pixel 201 that includes 4 neighboring pixels: one each immediately above, below, to the left of, and to the right of individual pixel 201.

Figure 2D:
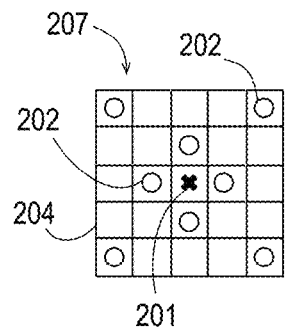

As shown in FIG. 2D, neighboring pixels 202 may be in an example pattern 207 within window 204 around individual pixel 201. As shown, pattern 207 may include neighboring pixels 202 arranged in a 4 pixel diamond pattern around individual pixel 201 and at the corners of 5 by 5 pixel window 204 such that pattern 207 may include 8 neighboring pixels 202 of individual pixel 201. For example, the diamond pattern may be around individual pixel 201 and may include 4 neighboring pixels immediately above, below, to the left of, and to the right of individual pixel 201. In another example (not illustrated), window 204 may be 7 by 7 pixels and neighboring pixels 202 may be arranged in a diamond pattern around individual pixel 201 analogous to the pattern of FIG. 2C and with neighboring pixels 208 at the corners of the 7 by 7 window such that the pattern includes 12 neighboring pixels 208.

Figure 2E:
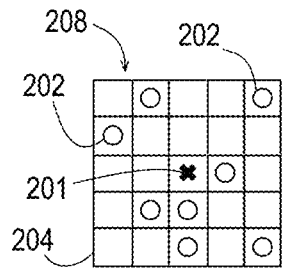

As shown in FIG. 2E, neighboring pixels 202 may be in an example pattern 208 within window 204 around individual pixel 201. As shown, pattern 208 may include 8 neighboring pixels 202 arranged in a selected or heuristically determined pattern around individual pixel 201. As shown, neighboring pixels 202 may be directly to the right of individual pixel 201, directly below individual pixel 201, down and to the left of individual pixel 201, at an upper right corner of window 211, at a lower right corner of window 211, centered along a bottom edge of window 211, to the right of the top left corner of window 211, and below the top left corner of window 211. In other examples, neighboring pixels 202 may be arranged in any selected or heuristically determined pattern with any number of neighboring pixels 202.

As shown, in some examples, the neighboring pixels may include 8 neighboring pixels, however, the embodiments discussed herein are not so limited. Any number of neighboring pixels such as 4, 8, 12, or any number of pixels in the range of 4-12, or more neighboring pixels may be used. Furthermore, the neighboring pixels may be within a window of any size such as 3 by 3 pixels, 5 by 5 pixels, or 7 by 7 pixels, or the like. Furthermore, the illustrated and discussed windows are square, but other shapes such as rectangular shapes may be used.

As discussed, directional weighted averages module 102 (please see FIG. 1) may, for individual pixels of input image 101, determine directional weighted averages 103 based on pixel values of neighboring pixels of each of the individual pixels and weights associated with locations of the neighboring pixel values relative to the individual pixels. FIGS. 2A-2E illustrate example neighboring pixel patterns and the illustrated neighboring pixels may have pixel values based on gray scale values of input image 101, luma values of input image 101, or the like. Any suitable weights for neighboring pixels 202 may be used.

FIGS. 3A, 3B, 3C, and 3D illustrate example weights for neighboring pixels of an individual pixel 201, arranged in accordance with at least some implementations of the present disclosure.

Figure 3A:
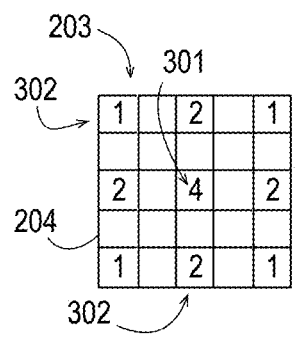
FIGS. 3A, 3B, 3C, and 3D illustrate example weights for neighboring pixels of an individual pixel.

As shown in FIG. 3A, individual pixel weight value 301 and neighboring pixel weight values 302 may be arranged in pattern 203 (as previously illustrated in FIG. 2A) within a window 204. As shown, individual pixel weight value 301 and neighboring pixel weight values 302 (in FIGS. 3A-3D only some neighboring pixels are labeled for the sake of clarity of presentation) may include a weight for the individual pixel and each neighboring pixel in pattern 203. In the illustrated embodiment, individual pixel weight value 301 is 4, corner neighboring pixel weight values 302 are 1 and neighboring pixel weight values 302 centered along the edges of 5 by 5 pixel window 204 are 2. In various examples, individual pixel weight value 301 and neighboring pixel weight values 302 may include any suitable weighting values that provide, for example, local texture improvement, resistance to noise, and/or filtering for input image 101. For example, individual pixel weight value 301 and neighboring pixel weight values 302 may be in the range of about 0 to 2, in the range of about 0 to 4, in the range of about 1 to 4, or in the range of about 1 to 8 or the like.

Figure 3B:
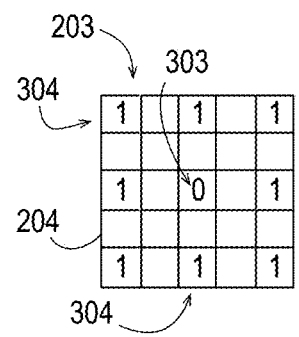

As shown in FIG. 3B, individual pixel weight value 303 and neighboring pixel weight values 304 may be arranged in pattern 203 (as previously illustrated in FIG. 2A) within a window 204. As shown, individual pixel weight value 303 and neighboring pixel weight values 304 may include a weight for the individual pixel and each neighboring pixel in pattern 203. In the illustrated embodiment, individual pixel weight value 303 is 0 (e.g., individual pixel 201 is not used in determining the directional weighted average) and corner neighboring pixel weight values 302 and neighboring pixel weight values 302 centered along the edges of 5 by 5 pixel window 204 are 1. In the example of FIG. 3B, the neighboring pixels of pattern 203 may all be equally weighted.

Figure 3C:
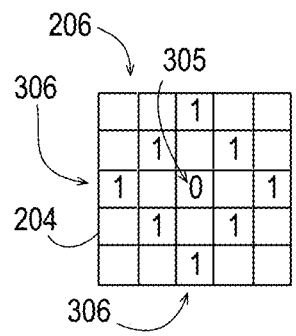

As shown in FIG. 3C, individual pixel weight value 305 and neighboring pixel weight values 306 may be arranged in pattern 206 (as previously illustrated in FIG. 2C) within a window 204. As shown, individual pixel weight value 305 and neighboring pixel weight values 306 may include a weight for the individual pixel and each neighboring pixel in pattern 206. In the illustrated embodiment, individual pixel weight value 305 is 0 (e.g., individual pixel 201 is not used in determining the directional weighted average) and neighboring pixel weight values 306 are all 1. In the example of FIG. 3C, the neighboring pixels may all be equally weighted. In other examples, neighboring pixel weight values 306 may include different weighting values. In some examples, weight values at the center of the edges of window 204 (e.g., the points of the diamond of shape 206) may have a greater value than the remaining neighboring pixel weight values 306. In other examples, weight values at the center of the edges of window 204 (e.g., the points of the diamond of shape 206) may have a lesser value than the remaining neighboring pixel weight values 306. For example, the neighboring pixel weight values 306 may be in the range of about 0 to 2, in the range of about 0 to 4, in the range of about 1 to 4, or in the range of about 1 to 8 or the like.

Figure 3D:
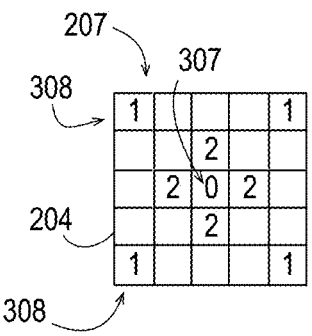

As shown in FIG. 3D, individual pixel weight value 307 and neighboring pixel weight values 308 may be arranged in pattern 207 (as previously illustrated in FIG. 2D) within a window 204. As shown, individual pixel weight value 307 and neighboring pixel weight values 308 may include a weight for the individual pixel and each neighboring pixel in pattern 207. In the illustrated embodiment, individual pixel weight value 307 is 0 (e.g., individual pixel 201 is not used in determining the directional weighted average), corner neighboring pixel weight values 308 are 1 and neighboring pixel weight values 308 arranged in a diamond around the individual pixel (e.g., above, below, right of, and left of the individual pixel) are 2. In various examples, individual pixel weight value 307 and neighboring pixel weight values 308 may include any suitable weighting values that provide local texture improvement, resistance to noise, and/or filtering for input image 101. For example, individual pixel weight value 307 and neighboring pixel weight values 308 may be in the range of about 0 to 2, in the range of about 0 to 4, in the range of about 1 to 4, or in the range of about 1 to 8 or the like.

Similarly, weight values may be determined for other patterns as discussed herein. In such examples, the individual pixel weight value and neighboring pixel weight values may include any suitable weighting values that provide, for example, local texture improvement, resistance to noise, and/or filtering for input image 101. For example, individual pixel weight value and neighboring pixel weight values may be in the range of about 0 to 2, in the range of about 0 to 4, in the range of about 1 to 4, or in the range of about 1 to 8 or the like. In some embodiments, the weight values may be predetermined or heuristically determined or the like.

As discussed, patterns (e.g., with respect to FIGS. 2A-2E) and weights (e.g., with respect to FIGS. 3A-3D) may be used to determine adaptive weighted averages for pixels of an input image. In some examples, the pattern and weights implemented may be predefined or preselected for implementation. In some examples, the pattern and weights implemented may be adaptively selected based on the input image. For example, input image 101 may be evaluated for various conditions (e.g., low light conditions, good lighting conditions, high or low contrast, or the like) and patterns and/or weights may be determined based on the evaluation. For example, an input image having good lighting conditions may implement a pattern having a larger neighborhood and/or more neighbor pixels to determined adaptive weighted averages while an input image having low light conditions may implement a pattern having a smaller neighborhood and/or fewer neighbor pixels to determined adaptive weighted averages. Furthermore, such adapting of patterns and/or weights may be implemented within input image 101 (e.g., on a portion or slice or the like of input image 101).

Based on the discussed individual pixel value, neighboring pixel values, individual pixel weight value, and/or neighboring pixel weight values, directional weighted averages module 102 (please see FIG. 1) may determine a directional weighted average for the individual pixel. For example, the directional weighted average may be based at least on pixel values of neighbor pixels the individual pixels and weights associated with locations of each of the neighbors pixels relative to the individual pixels (as discussed). In an embodiment, the directional weighted average is generated as a summation of the products of each of the pixel values of the neighboring pixels and each of the associated first plurality of weights divided by a summation of the first plurality of weights. For example, the directional weighted average may be determined as shown in Expression (1):

$$x_a = \frac{\left(\begin{array}{c} w_0 x_0 + w_1 x_1 + w_2 x_2 + w_3 x_3 + w_4 x_4 + \\ w_5 x_5 + w_6 x_6 + w_7 x_7 + w_8 x_8 \end{array}\right)}{(w_0 + w_1 + w_2 + w_3 + w_4 + w_5 + w_6 + w_7 + w_8)} \qquad (1)$$

where $x_a$ may be the directional weighted average for the individual pixel, $x_0$ may be the individual pixel value (e.g., gray scale value), $x_1, x_2, \ldots, x_8$ may be the pixel values (e.g., gray scale values) for the neighboring pixels, $w_0$ may be the individual pixel value weight, and $w_1, w_2, \ldots, w_8$ may be the neighboring pixel value weights. For example, the individual pixel value weight and neighboring pixel value weights may be predetermined as discussed. For example, the neighboring pixel value weights may be predetermined based on their positions with respect to the individual pixel. Such a directional weighed average may provide a directional weighted filtering of the input image for object detection. For example, pattern 203 and weights 301, 302 may provide a low pass filter.

In such a manner, directional weighted averages module 102 may determine directional weighted averages 103 for pixels of input image 101. In some examples, directional weighted averages module 102 may determine directional weighted averages 103 for all pixels of input image 101. In some examples, directional weighted averages module 102 may determine directional weighted averages 103 for some or most pixels of input image 101. For example, boundary or edge pixels of input image 101 may not have certain neighbors for calculating a directional weighted average (e.g., a boundary pixel along the top edge of input image 101 may not have neighbors above it). Such boundary or edge pixels may be discarded, left unchanged (e.g., no weighted average may be taken and the pixel value may be used), or an altered pattern may be used to determine a directional weighted average for edge or boundary pixels.

Continuing with FIG. 1, directional weighted averages 103 may be transmitted to feature representation module 104. Feature representation module 104 may generate a feature representation (FR) 105 of input image 101 based on directional weighted averages 103. For example, feature representation module 104 may extract features (e.g., information relevant for object detection) from input image 101 based on directional weighted averages 103 and/or input image 101.

In an embodiment, feature representation 105 may include a Haar-like feature representation based on directional weighted averages 103. For example, Haar-like features may include the differences of the sums of directional weighted averages 103 for pixels within different regions of input image 101 or the like.

Figure 4:
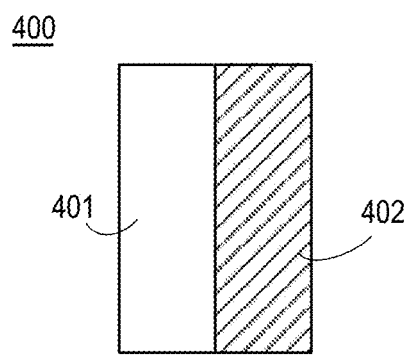
FIG. 4 illustrates example regions for feature representations using Haar-like features.

FIG. 4 illustrates example regions 401, 402 for feature representation using Haar-like features, arranged in accordance with at least some implementations of the present disclosure. As shown in FIG. 4, a Haar-like feature pattern 400 may be evaluated based on region 401 and region 402. For example, directional weighted averages 103 may be summed for region 401 to determine a region 401 directional weighted averages sum and directional weighted averages 103 may be summed for region 402 to determine a region 402 directional weighted averages sum. The region 401 directional weighted averages sum and the region 402 directional weighted averages sum may be differenced to determine the Haar-like feature. As is discussed further herein, various regions (e.g., scan windows 702 of FIG. 7) of input image 101 may be evaluated based on Haar-like feature pattern 400 (and similar patterns including 2 or more rectangles) to determine weak classifier(s). The weak classifiers may be evaluated based on a boosted cascade structure for the determination of candidate object recognition regions. In an embodiment, an integral image or images may be generated based on directional weighted averages 103 for use in evaluating Haar-like features or feature patterns.

In another embodiment, feature representation 105 may include a SURF-like feature that is similar to speeded up robust feature. For example, SURF-like feature(s) may include horizontal gradients, vertical gradients, the absolute value of horizontal and/or vertical gradients, diagonal gradients, anti-diagonal gradients, and/or the absolute value of diagonal and/or anti-diagonal gradients. Such values may be determined for individual pixels of input image based on directional weighted averages 103. For example, directional weighted averages 103 may be used to determine the discussed gradients based on a gradient filter or gradient filter kernel or the like. As is discussed further herein, the gradients may be used to determine weak classifier(s). The weak classifiers may be evaluated based on a boosted cascade structure for the determination of candidate object recognition regions. For example, the boosted cascade structure may include logistic regression based classifiers. For additional information associated with SURF-like features and a boosted cascade structure for SURF-like features, please refer to U.S. patent application Ser. No. 13/977,137 (U.S. Pat. Pub. No. US 2013/0272575 A1), filed as PCT/CN2011/081642 on Nov. 1, 2011, and titled "Object Detection Using Extended SURF Features".

In another embodiment, feature representation 105 may include a binary coded image based the directional weighted averages 103 and the pixel values of the plurality of neighbor pixels (e.g., neighbor pixels 202 as discussed). For example, generating a binary coded image may include assigning, to each neighbor pixel of the individual pixel, a value of 0 or 1 based on a comparison of each of the pixel values of the neighbor pixels to the directional weighted average for the individual pixel and determining a binary coed representation for the individual pixel based on the assigned values (e.g., the assigned 0s or 1s). In an embodiment, a value of 1 is assigned to each neighbor pixel if the pixel value of the neighbor pixel is greater than the directional weighted average of the individual pixel and a value of 0 is assigned otherwise. In an embodiment, the assigned values are arranged into an order based on starting at a top-left neighbor pixel and continuing in a clockwise manner through the neighbor pixels, as is discussed further herein. Generating a binary coded image may not require the determination of integral image(s), which may provide for less intensive computing and memory requirements.

Figure 5:
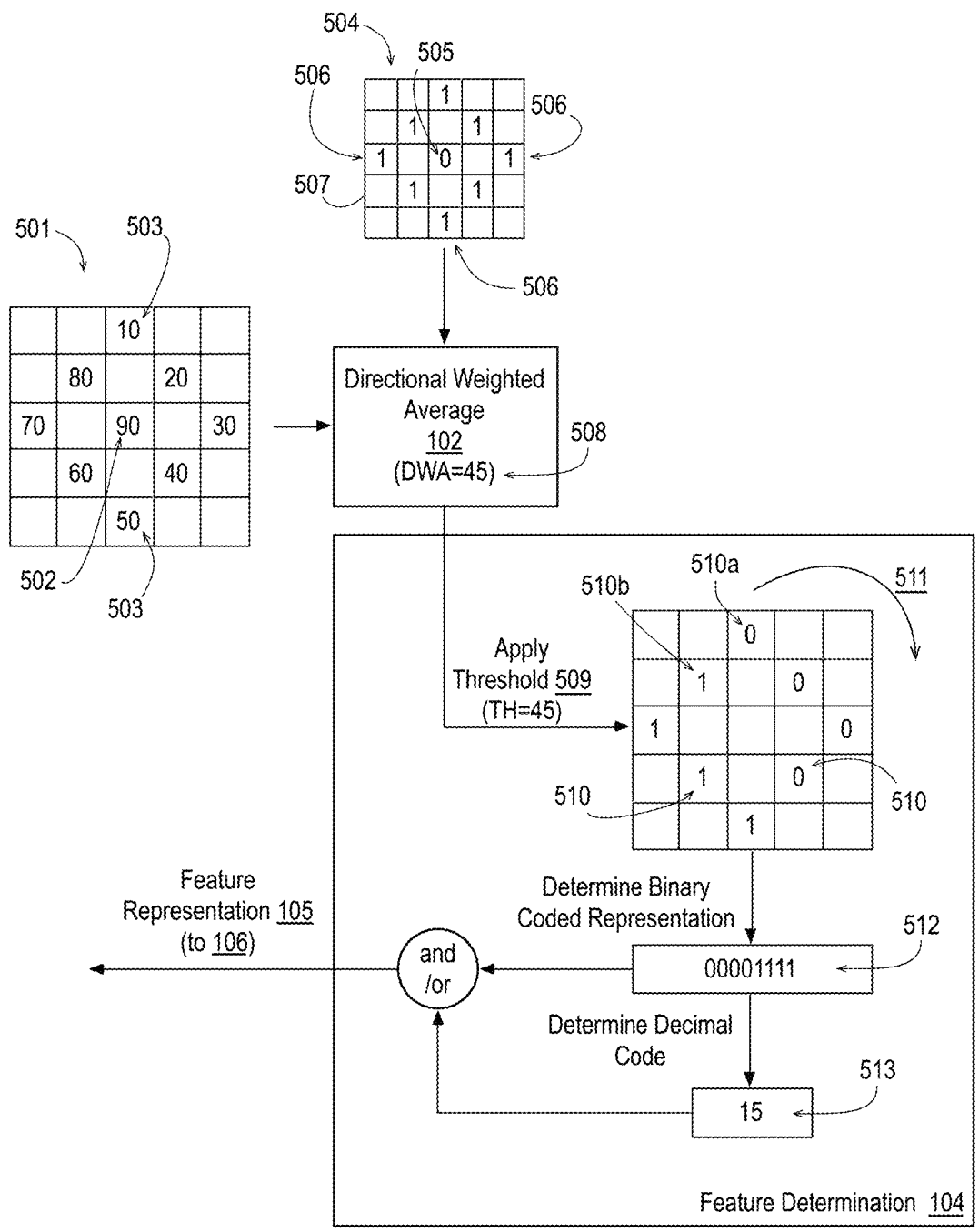
FIG. 5 illustrates a portion of example system for generating an example feature representation.

FIG. 5 illustrates a portion of example system 100 for generating example feature representation 105, arranged in accordance with at least some implementations of the present disclosure. As shown in FIG. 5, directional weighted average module 102 may receive a portion 501 of input image 101 (or determine or generate portion 501 based on received input image 101 or the like). For example, portion 501 of input image 101 may include individual pixel value 502 (e.g., a value of 90) and neighboring pixel values 503 (e.g., values of 10, 20, 30, 40, 50, 60, 70, and 80; in FIG. 5, only a few of neighboring pixel values 503 are labeled for the sake of clarity). Directional weighted average module 102 may also receive (or determine or the like) weighted pattern 504, which may include individual pixel weight value 505 and neighboring pixel weight values 506 (in FIG. 5, only a few of neighboring pixel weight values 506 are labeled for the sake of clarity) within window 507. In the example of FIG. 5, weighted pattern 504 corresponds to pattern 206 of weights 305, 306 as discussed herein with respect to FIG. 3C, however, the embodiments discussed herein are not so limited.

As discussed herein, directional weighted average module 102 may determine a directional weighted average 508 for the individual pixel based on a weighted averaging of individual pixel value 502 and neighboring pixel values 503 and based on individual pixel weight value 505 and neighboring pixel weight values 506. Based on the illustrated example, directional weighted average 508 for the individual pixel is 45 (e.g., please refer to Expression (1)).

In an embodiment, feature determination module 104 may determine feature representation 105 as follows. As shown, feature determination module 104 may apply a threshold 509 to neighboring pixel values 503 to generate assigned values 510 (in FIG. 5, only a few of assigned values 510 are labeled for the sake of clarity). For example, threshold 508 may be the directional weighted average for the individual pixel (e.g., TH=45). In an embodiment, feature determination module 104 may assign, to each of the neighbor pixels of the individual pixel, a value of 0 or 1 based on a comparison of each of neighboring pixel values 503 to directional weighted average 508 for the individual pixel to generate assigned values 510. For example, if the neighboring pixel value is greater than directional weighted average 508, a value of 1 may be assigned and otherwise a value of 0 may be assigned. For example, neighboring pixel values 503 may be compared to directional weighted average 508 such that if $x_i > x_a$, assign 1, otherwise assign 0, where $x_i$ may be the neighboring pixel values 503 (e.g., $x_1, x_2, \ldots, x_8$) and $x_a$ may be the directional weighted average 508 (e.g., a threshold).

As shown, feature determination module 104 may arrange assigned values 510 based on a direction 511. In the illustrated example, feature determination module 104 may arrange assigned values 510 in a clockwise manner beginning at an upper left most assigned value 510a (e.g., beginning at an upper left location and moving right until upper left most assigned value 510a is reached) and continuing until a last assigned value 510b is reached. In an embodiment, feature determination module 104 may arrange assigned values 510 in a clockwise manner beginning at the upper left most assigned value, completing outer assigned values, and continuing inwardly until the last assigned value is reached (see, e.g., FIGS. 2D and 2E where edge assigned values of the illustrated windows may be completed before going inwardly from the 5 by 5 edge to the 3 by 3 edge and so on). In the illustrated example, feature determination module 104 may begin at the neighboring pixel centered along the top edge of the window of assigned values 510 (e.g., assigned value 510a; a value of 0) and continue in a clockwise manner to generate binary coded representation 512. Also as shown, a decimal code 513 associated with binary coded representation 512 may optionally be generated by feature determination module 510a by converting binary coded representation 512 to decimal code (e.g., 00001111 in binary equals 15 in base ten). As discussed, in some examples, binary coded representation 512 may include 8-bits based on the number of neighboring pixels. Binary coded representation 512 may include any number of bits such as 4, 8, 12, any number of bits in the range of 4-12, or more, depending on the number of neighboring pixels evaluated.

As shown in FIG. 5, feature determination module 104 may transfer one of or both of binary coded representation 512 and decimal code 513 to multi-stage classifier module 106 (please refer to FIG. 1). Feature determination module 104 may determine binary coded representations and/or decimal codes as described for some, a majority, or all of the pixels associated with input image 101. For example, directional weighted average module 102 and feature determination module 104 may scan or loop over input image 101 to encode pixels with a binary coded representations and/or decimal codes to generate feature representation 105. In such embodiments, feature representation 105 may be described as a binary coded image and may be used as a feature representation of input image 101. Such embodiments may be advantageous with respect to Haar-like features and/or SURF-like features as no integral image(s) are needed.

Figure 6:
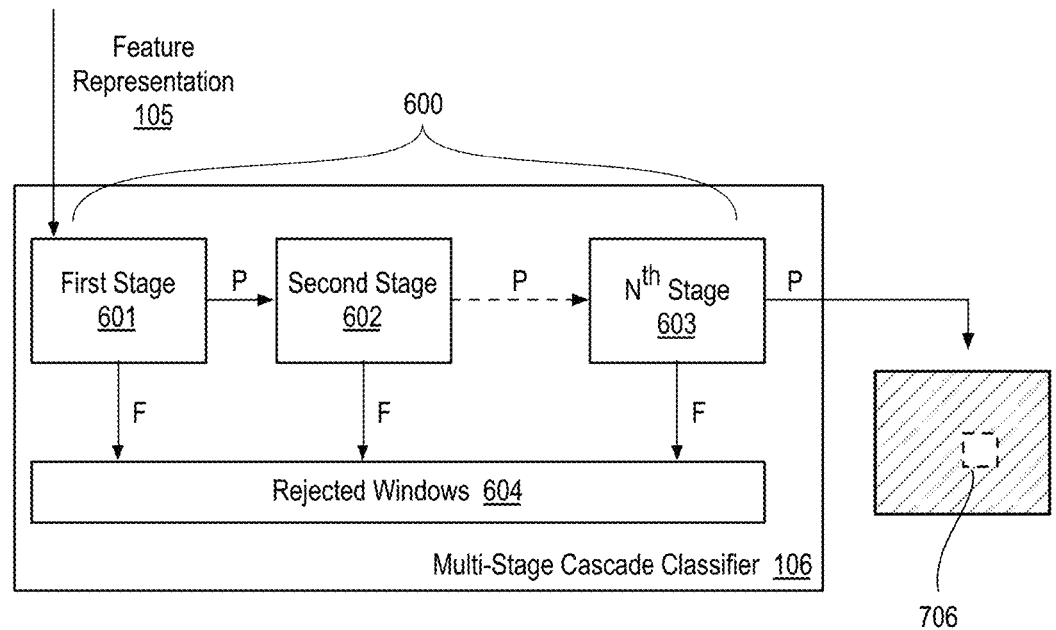
FIG. 6 illustrates an example multi-stage cascade classifier.

FIG. 6 illustrates example multi-stage cascade classifier 106, arranged in accordance with at least some implementations of the present disclosure. Multi-stage cascade classifier 106 may perform object detection on input image 101 by applying a multi-stage cascade classifier to feature representation 105. As shown, multi-stage cascade classifier 106 may include multiple stages 600 such as first stage 601, second stage 602, and $N^{th}$ Stage 603. Furthermore, multi-stage cascade classifier 106 may include a rejected windows module 604 for discarded scan windows (e.g., scan windows that do not pass a stage of multiple stages 600). Multiple stages 600 may include any suitable number of stages for evaluating classifiers for a region of an image to determine a candidate region. In an embodiment, multiple stages 600 include 4 to 12 stages. For example, the number of stages may be determined based on a size and quality of a training set used to establish the stages. Feature representation 105 or a portion of feature representation 105 may be provided to multi-stage cascade classifier 102 for evaluation, as shown in FIG. 6.

Figure 7:
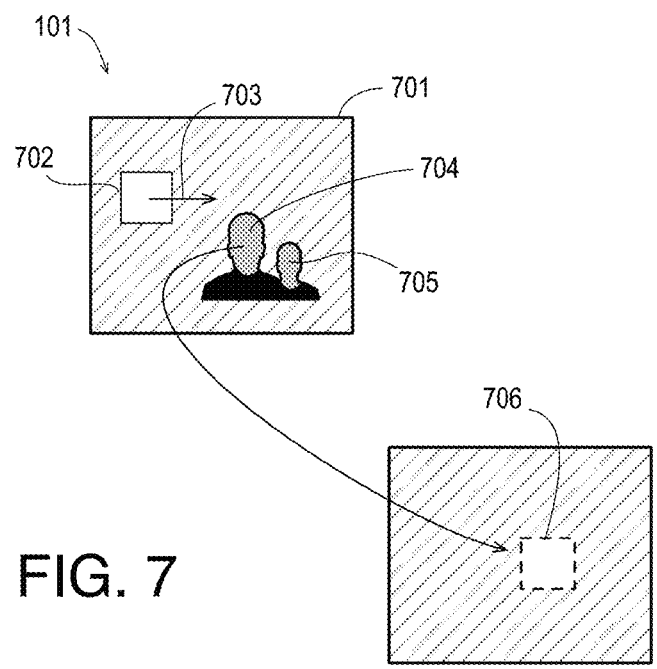
FIG. 7 illustrates an example input image and an example candidate region.

For example, FIG. 7 illustrates an example input image 101 and an example object detection candidate region 706 (e.g., a passing scan window), arranged in accordance with at least some implementations of the present disclosure. As shown, a scan window 702 may be established within input image 101. Scan window 702 may scan across (e.g., in direction 703) and down input image 101 such that features of feature representation 105 may be evaluated within scan window 702. For example, scan window 702 may scan from the top left of input image 101 left to right, back to the left and down and across and so on, although embodiments herein are not limited to a particular scanning pattern. In an embodiment, scan window 702 may be evaluated and then may move one pixel or two pixels or the like for a next evaluation and so on such that many evaluations may be performed for input image 101. Scan window 702 may have any size such as 32 by 32 pixels, for example.

Returning to FIG. 6, scan window 702 may be evaluated at first stage 601. If scan window 702 passes first stage 601 (indicated via "P"), it may be transferred to second stage 602. If scan window 702 passes second stage 602, it may be passed along to a third stage and so on. If scan window 702 passes all stages (e.g., through Nth stage 603) of multiple stages 600, it may be saved or reserved as a candidate region 706 (e.g., candidate region 706 may be stored in memory, displayed to a user, transferred for further processing, or the like). As shown, if scan window 702 fails any of multiple stages 600, it may be discarded via rejected windows module 604 (e.g., discarded as unlikely to contain the object of interest such as a face). For example, referring to FIG. 7, candidate region 706 may be a passing scan window associated with an image feature 704 (e.g., a human face). FIG. 7 also illustrates an image feature 705 (e.g., a human face). In some examples, image feature 705 may not be detected via scan window 702 but may be detected in a subsequent resizing the input image (e.g., image feature 705 may be too small to be detected by scan window at a current scaling but may be detected at a different scaling factor).

As discussed, feature representation 105 may include, for example, Haar-like features based on weighted directional averages, SURF-like features based on weighted directional averages, binary coded representations based on weighted directional averages, or the like. In examples where feature representation 105 includes Haar-like features based on weighted directional averages, multiple stages 600 may include a comparison of a Haar-like feature (e.g., the differences of the sums of directional weighted averages for pixels within different regions of scan window 702; please refer to FIG. 4) to a predetermined or pre-trained threshold or the like. In an embodiment, each stage of multiple stages 600 may evaluate a different Haar-like feature (e.g., different rectangular portions in different configurations) seeking to identify a characteristic of an object (e.g., eyes of a face, a nose, and soon).

In examples where feature representation 105 includes SURF-like features based on weighted directional averages, multiple stages 600 may include a boosted classifier cascade using logistic regression based classifier. For example each stage may be associated with a different region of scan window 702 and may evaluate an applied logistic regression model defining a probability of weak classifier(s) (e.g., gradients as discussed) indicating an object (e.g., a face) is within scan window 702.

In examples where feature representation 105 includes binary coded representations based on weighted directional averages, multiple stages 600 may include Naïve Bayesian classifiers implemented via look up tables (LUTs). In an embodiment, one or more of multiple stages 600 may be implemented determining, for multiple positions in a training set of images, a Bayesian table having probabilities of an object feature for a range of feature representations and another Bayesian table having probabilities of no object feature for the range of feature representations, selecting target positions form the multiple positions for the stage based on a power of each of the multiple positions. Furthermore, a threshold may be determined for the stage based on a summation of differences between probabilities the target positions include an object feature and probabilities the positions do not include the object feature, as is discussed further below. In some examples, multiple stages 600 may include an area under a rate of change curve (e.g., AUC) training framework.

In an embodiment, evaluating, for a scan window, one or more of multiple stages 600 may include determining, for the target positions (e.g., multiple positions in a region or scan window of input image 101), a summation of differences between probabilities the target positions include an object feature and probabilities the positions do not include the object feature. As is discussed further below, the differences may be implemented via a plurality of look up tables (e.g., one look up table for each target position) such that each table includes differences associated with a feature representation value (e.g., a Haar-like feature value, one or more SURF-like features such as gradients or absolute values of gradients, or binary coded representations of a binary coded image, or the like).

In the following discussion, implementing and applying stages is discussed with respect to binary coded representations of binary coded images, however, any feature representation as discussed herein may be implemented as discussed and, in particular, in a look up table based multi-stage system. In an embodiment, implementing the stages includes a supervised training based on a training set. For example, as discussed, a binary coded representation of an input image may include 8-bit binary coded images with associated decimal codes ranging from 0 to 255 (e.g. from 00000000 to 11111111). A Naïve Bayesian model may be built based on the binary coded image as follows. Based on a training set (e.g., set of images), for a given position x (e.g., within scan window 702), the following probabilities may be determined: P(x=c|y=0) and P(x=c|y=0), where y=1 for an object being present (e.g., for a face) and y=0 for no object being present (e.g., for a non-face). For example P(x=c|y=0) may be read as the probability an image window does not include the object given x=c, where c is the binary coded representation (e.g., c may be from 0 to 255) at position x. Furthermore, the following probabilities may be determined based on the training set: P(y=0) and P(y=1) (e.g., the probability a scan window does not have an object, and does have an object, respectively).

In an embodiment, P(x|y=1) and P(x|y=0) for any location may be provided as two Bayesian tables for position x. For example, each table may have 256 values associated with the possible binary coded values (e.g., c may be from 0 to 255) such that P(x|y=1) may be a table of the probability at a position x that the scan window has the object being sought based on c (e.g., the table may include a probability associated with each possible value of c). Similarly, P(x|y=1) may be a table of the probability at a position x that the scan window does not have the object being sought based on c.

In an embodiment, a boosting training framework may select a set of positions $\{x_i\}$ from binary coded images of the training set. For example, binary coded images may be generated as discussed herein for images in the training set. For example, the selection of the set of positions may be based on a power of each position (e.g., a distinguished power of position) as provided by Expression (2):

$$\sum_{c=0}^{255} \{P(y=1|x=c) - P(y=0|x=c)\} \quad (2)$$

where P(y=1|x=c) may be the posterior possibility and may be determined via the Bayes formula as shown in Expression (3):

$$P(y=1|x=c) = \frac{P(x=c|y=1)P(y=1)}{\sum_y \{P(x=c|y)P(y)\}} \quad (3)$$

In such examples, each position (e.g., $x_i$) and corresponding Bayesian table may be a weak classifier for various stages of multi-stage cascade classifier module 102. For example, a stage (e.g., a boosting stage) may include a set of selected positions $\{x_i\}$ (e.g., selected as discussed) and a trained threshold, TH. For example, a given scan window converted to a binary coded image as discussed, a boosting Bayesian classification may be performed as provided in Expression (4):

$$\sum_i P(y=1|x_i=c) - P(y=0|x_i=c) > TH \quad (4)$$

For example, threshold, TH, may be associated with a summation of differences between probabilities the (target) positions include an object feature and probabilities the positions do not include the object feature. In an embodiment, a look up table value may be defined as shown in Expression (5):

$$LUT(x_i=c) = P(y=1|x_i=c) - P(y=0|x_i=c) \quad (5)$$

such that the classification may be performed via look up tables as provided in Expression (6):

$$\sum_i LUT(x_i=c) > TH \quad (6)$$

As shown in Expressions (5) and (6), for each of multiple target positions in a region (e.g., a scan window or the like) of in an input image, a summation of differences between probabilities the position (e.g., target position) includes an object feature and probabilities the position does not include the object feature may be determined based on the differences being implemented via a look up table for each position. Each look up table may include a difference for each feature representation value (e.g., binary coded representations) at the associated target position. The summation of differences may be compared o the predetermined threshold such that if the summation is greater than the threshold, the scan window (or region or the like) passes the classifier stage and otherwise the scan window is rejected (please refer to FIG. 6).

In an embodiment, the above classification for a stage of multiple stages 600 may be applied or performed (e.g., in an object detection phase) as follows. For each position $x_i$ (e.g., each stage may use several positions) in a scan window, the value of the binary coded image may be determined (e.g., a binary coded representation or decimal code ranging from 0 to 255). For each position, a separate look up table may be accessed to determine a look up table value based on the binary coded value at the position as shown in Expression (7):

$$LUT(x_i=c) \quad (7)$$

The look up table values may be summed for all locations as shown in Expression (8):

$$\sum_i LUT(x_i = c) \qquad (8)$$

The summation may be compared to the predetermined and/or pre-trained threshold as shown in Expression (9)

$$\sum_i LUT(x_i = c) > TH \qquad (8)$$

If the scan window passes Expression (9) (e.g., the sum of look up table values is greater than the threshold), it passes the stage, otherwise it fails the stage and is rejected to rejected windows module 604 (please refer to FIG. 6).

The above discussed operations may be performed together or separately to provide for object detection (e.g., face detection).

Figure 8:
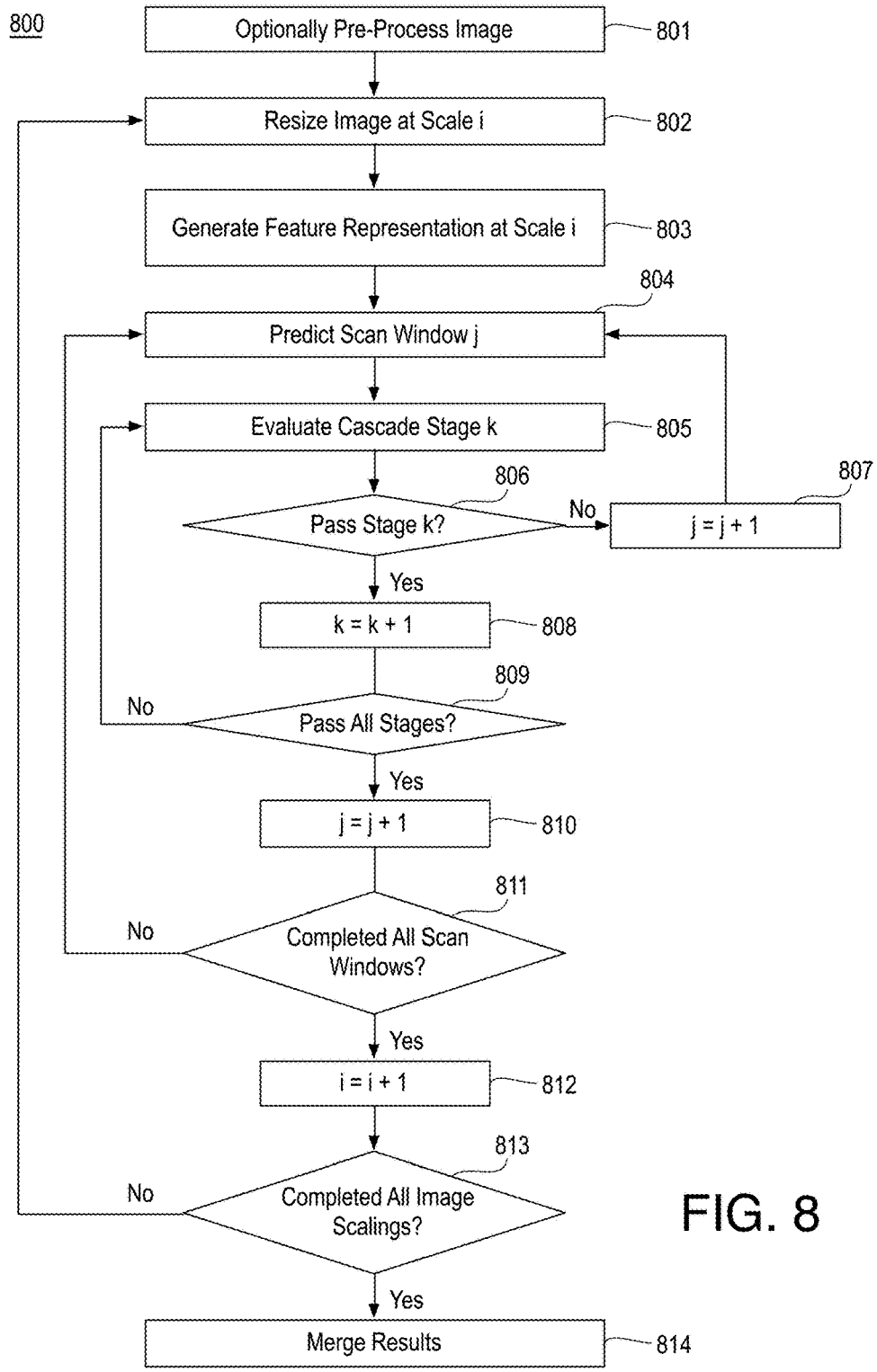
FIG. 8 is a flow diagram illustrating an example process for object detection.

FIG. 8 is a flow diagram illustrating an example process 800 for object detection, arranged in accordance with at least some implementations of the present disclosure. Process 800 may include one or more operations 801-814 as illustrated in FIG. 8. Process 800 may form at least part of an object detection process. By way of non-limiting example, process 800 may form at least part of an object detection process for one or more input images as undertaken by system 100 as discussed herein.

Process 800 may begin at operation 801, "Optionally Pre-Process Image", where an input image, target image, subject image or the like may be pre-processed. In an embodiment, the pre-processing may include converting the image from a color image to a gray scale image. The input image may include any image or image file such as, for example, a real-time image, a decoded image, a captured image (e.g., via a camera or the like), a rendered image, an image from a sequence of video images or frames, an image retrieved from memory, or the like. For example, a user or process (e.g., software process) may invoke process 800 via system 100.

Process 800 may continue at operation 802, "Resize Image at Scale i", where the image may be resized at scale i (e.g., a counter variable). For example, in object detection it may be advantageous to inspect the image at various scaling sizes to detect within the image objects of different sizes. In an example, a scan window may have a predetermined size (e.g., 32 by 32 pixels) and the image may be scaled to a size compatible with scanning based on the size of the scan window. For example, the image may first be evaluated at its native size (e.g., no resizing may be performed) and subsequent iterations (e.g., from decision operation 813) may scale the image based on a scaling factor (e.g., 1.05, 1.1, 1.2, 1.5, or the like) and repeat the scaling until the image is scaled to the size of the scan window or a multiple of the scan window or the like. A smaller scale factor may provide more quality at the cost of reduced speed. In some examples, the scaling factor is kept constant at various iterations and in other examples it may be varied. In an embodiment, the image is a 1080p image and the scan window is 32 by 32 pixels.

Process 800 may continue at operation 803, "Generate Feature Representation at Scale i", where a feature representation of the image at scale i (e.g. input image 101 as discussed herein may be generated. For example, feature representation 105 may be generated as discussed herein. In an embodiment, generating the feature representation includes determining directional weighted averages for pixels of the image at scale i and generating the feature representation based on the directional weighted averages. In various embodiments, the feature representation may include a Haar-like feature based representation, a SURF-like feature based representation, or a binary coded based image based representation. In an embodiment, feature representation 105 as a may be determined as a binary coded image as discussed with respect to FIG. 5.

Process 800 may continue at operation 804, "Predict Scan Window j", where a scan window j (e.g., a counter variable) within the input image may be predicted or determined. For example, at a first iteration the scan window may be at a top left of the input image and at subsequent iterations (e.g., from decision block 811) the scan window may proceed by a number of pixels to the right until it reaches the right of the input image and then down by the number of pixels and back to the left of the image and so on until the entire input image has been scanned. For example, the number of pixels moved at each iteration may be 1 or 2 pixels or more such that many scan windows may be evaluated. A smaller movement of the scan window may provide higher quality at the cost of processing resources and time for example.

Process 800 may continue at operation 805, "Evaluate Cascade Stage k", where a cascade stage k (e.g., where k is a counter variable) may be evaluated. For example, a stage of multi-stage cascade classifier 102 may be evaluated for scan window j. In an embodiment, evaluating scan window j at stage k may include evaluating weak classifiers based on the feature representation as discussed herein. In an embodiment, a look up table classifier based on the binary coded image may be performed as discussed with respect to FIG. 6 and Expressions (7)-(9) herein. In an embodiment, stage k includes a look up table (LUT) classifier. For example, at a first iteration, first stage 601 may be evaluated and at subsequent iterations (if scan window j has passed earlier iterations), subsequent stages of multiple stages 600 may be evaluated. As subsequent stages are evaluated, the classification and testing of scan window j may classify and test based on different image characteristics (e.g., evaluating for eyes or teeth or the like) and/or the classification and test may become more rigorous (e.g., more positions $\{x_i\}$ may be evaluated) and/or more difficult to pass (e.g., with a higher relative threshold, TH). In an embodiment, a first stage includes 10-20 positions, a second stage includes 20-40 positions, and subsequent stages each include more than 40 positions.

Process 800 may continue at decision operation 806, "Pass Stage k?", where it may be determined whether scan window j has passed cascade stage k. If scan window j failed cascade stage k, scan window j may be discarded (e.g., via rejected windows module 604) and processing may continue at operation 807, "j=j+1", where counter variable j may be increased by one, the scan window may be moved by a step within the input image and processing may continue as discussed at operation 804, "Predict Scan Window j", where the next scan window may be predicted or determined.

If scan window passed cascade stage k, process 800 may continue at operation 808, "k=k+1", where the counter variable k may be increased by one, and at operation 809, "Pass All Stages", where it may be determined whether scan window j has passed all the stages. If scan window j has not passed all the stages (e.g., there are more stages in the multi-stage cascade and k<the number of stages), process 800 may continue at operation 805, "Evaluate Cascade Stage k", as discussed above.

If scan window j has passed all the stages, scan window j may be saved or reserved (not shown) for subsequent merging at operation 814. In such examples, scan window j has been deemed an object candidate region or window (e.g., a region or window determined to have or determined to be likely to have an object of interest therein). In some examples, scan window j may be presented to a user (e.g., in a camera display indicating a facial recognition) in alternative to or in addition to being saved or reserved for later merging.

Process 800 may continue at operation 810, "j=j+1", where counter variable j may be increased by one, and at operation 811, "Completed All Scan Windows", where it may be determine whether all scan windows have been completed (e.g., evaluated for an object of interest). If all of the scan windows have not been evaluated, process 800 may continue at operation 804, "Predict Scan Window j", where subsequent scan window(s) may be predicted or determined for evaluation as discussed above.

If all of the scan windows have been evaluated, process 800 may continue at operation 812, "i=i+1", where counter variable i may be increased by one, and at operation 813, "Completed All Image Scalings", where it may be determined whether all image scalings have been completed (e.g., all image scalings of the target image have been completed). If all image scalings have not been completed, process 800 may continue at operation 802, "Resize Image at scale i", where the image may be resized for repeated processing as discussed (e.g., determination of feature representation, determination of scan windows, evaluation of scan windows via cascade stages, and so on).

If all image scalings have been completed, process 800 may continue at operation 814, "Merge Results", where the results may be merged. For example, any passing scan windows (e.g., object candidate regions) may be merged and saved and/or presented to a user. For example, for each passing scan window, a location and size (e.g., based on the above scaling) of the object candidate region may be saved, used for further processing, and/or presented to a user or the like. In an embodiment, merging the results includes grouping the passing scan windows, merging them, and performing non-maximum suppression. In an example, a first and second scan window may have passed the multi-stage cascade classifier system discussed herein and the scan windows may be merged as object candidate regions. The object candidate regions may be processed by saving to memory, presentment to a user, or the like.

Portions of process 800 may be repeated any number of times either in series or in parallel for any number pixels, stages, or input images to generate any number of object candidate regions. Also as discussed, the input image(s) may include a decoded image, a captured image (e.g., via a camera or the like), a rendered image, or an image from a sequence of video images or frames, or the like.

Figure 9:
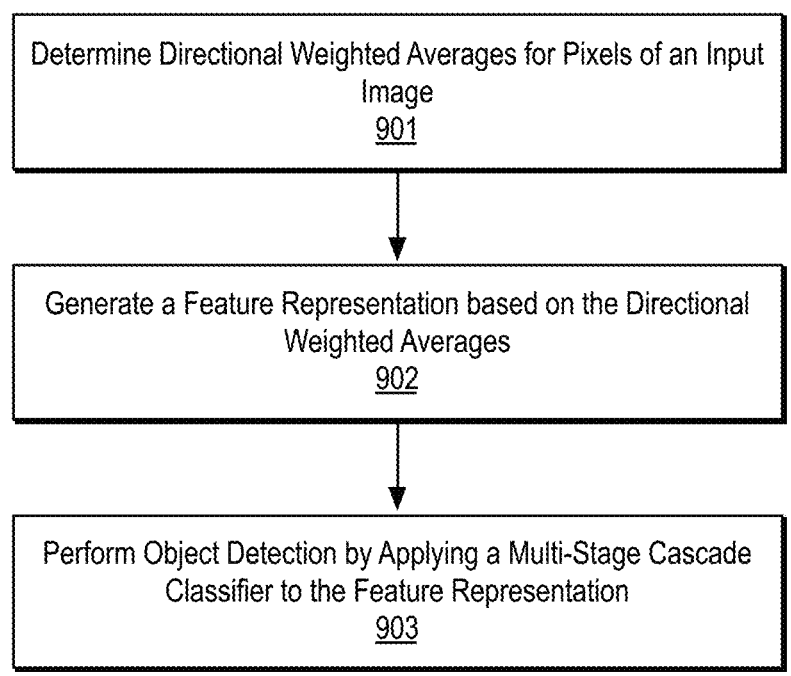
FIG. 9 is a flow diagram illustrating an example process for object detection.

FIG. 9 is a flow diagram illustrating an example process 900 for providing object detection, arranged in accordance with at least some implementations of the present disclosure. Process 900 may include one or more operations 901-903 as illustrated in FIG. 9. Process 900 may form at least part of an object detection process. By way of non-limiting example, process 900 may form at least part of an object detection process for one or more input images as undertaken by system 100 as discussed herein. Further, process 900 will be described herein in reference to system 1000 of FIG. 10.

Figure 10:
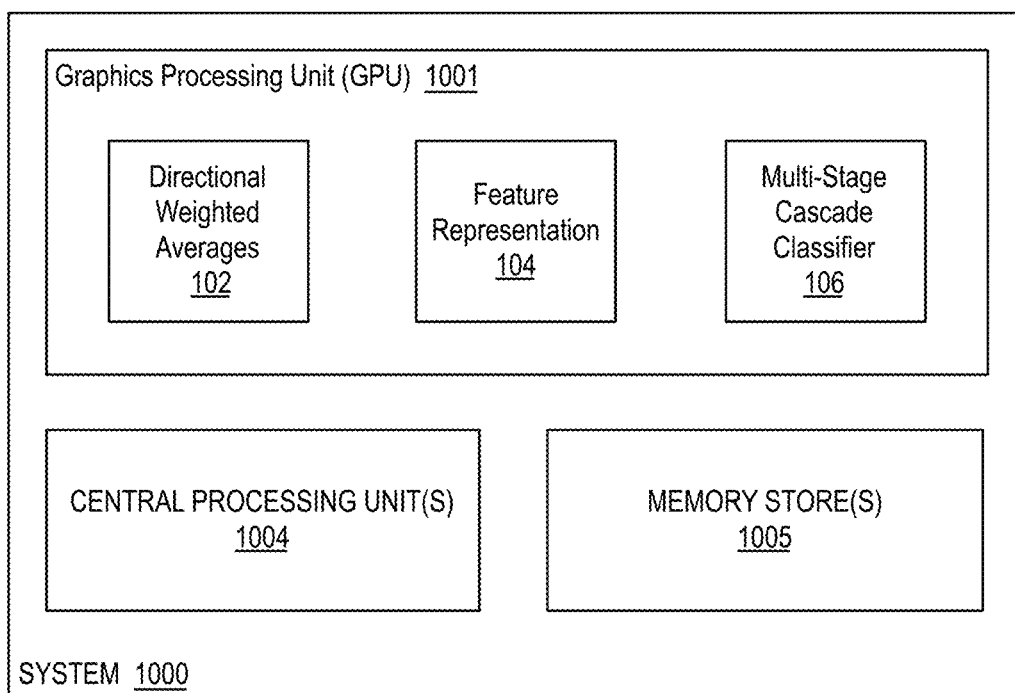
FIG. 10 is an illustrative diagram of an example system.

FIG. 10 is an illustrative diagram of an example system 1000, arranged in accordance with at least some implementations of the present disclosure. As shown in FIG. 10, system 1000 may include a graphics processing unit (GPU) 1001, one or more central processing units 1004, and memory stores 1005. Also as shown, GPU 1001 may include directed weighted averages module 102, feature representation module 104, and multi-stage cascade classifier module 106. In the example of system 1000, memory stores 1005 may store image content such as input images and/or object detection candidate regions.

Graphics processing unit 1001 may include any number and type of graphics processing units that may provide the operations as discussed herein. Such operations may be implemented via software or hardware or a combination thereof. For example, graphics processing unit 1001 may include circuitry dedicated to manipulate images from memory for presentation to a user. Central processing units 1004 may include any number and type of processing units or modules that may provide control and other high level functions for system 1000. Memory stores 1005 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1005 may be implemented by cache memory. In an embodiment, directional weighted averages module 102, feature representation module 104, and/or multi-stage cascade classifier 106 may be implemented via an execution unit (EU) of graphics processing unit 1001. The EU may include, for example, programmable logic or circuitry such as a logic core or cores that may provide a wide array of programmable logic functions. In an embodiment, directional weighted averages module 102, feature representation module 104, and/or multi-stage cascade classifier 106 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 may begin at operation 901, "Determine Directional Weighted Averages for Pixels of an Input Image", where directional weighted averages for pixels of an input image may be determined. For example, directional weighted averages 103 may be determined by directional weighted averages module 102 implemented via graphics processing unit 1001 as discussed herein. In an embodiment, directional weighted averages 103 may include, for an individual pixel, determining a weighted average based on pixel values of a pattern of neighboring pixels of the individual pixel and weights of the neighboring pixels (based on each neighboring pixel's location relative to the individual pixel).

Processing may continue at operation 902, "Generate a Feature Representation based on the Directional Weighted Averages", where a feature representation of the input image may be generated base don the directional weighted averages. For example, feature representation 105 may be generated by feature representation module 104 implemented via graphics processing unit 1001 as discussed herein. In various embodiments, the feature representation may include Haar-like features, SURF-like features, or a binary coded image.

Processing may continue at operation 903, "Perform Object Detection by Applying a Multi-Stage Cascade Classifier to the Feature Representation", where object detection may be performed by applying a multi-stage cascade classifier to the feature representation. For example, multi-stage cascade classifier 106, implemented via graphics processing unit 1001, may perform object detection based on feature representation 105. As discussed, any number of stages (e.g., 5-12 stages) may be implemented via multi-stage cascade classifier 106. In various embodiments, the stages may include logistic regression based classifiers or Naïve Bayesian classifiers implemented via look up table or the like.

As discussed, successful scan windows or regions or the like may be optionally merged and/or saved for further processing or presentment to a user or the like. Process 900 may be repeated any number of times either in series or in parallel for any number of input images.

Various components of the systems described herein may be implemented in software, firmware, and/or hardware and/or any combination thereof. For example, various components of system 100 or system 1000 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes (e.g., process 800 and process 900) discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100 or 1000, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

The discussed object detection (e.g., face detection) systems and processes may provide for real-time object detection across different platforms and different resolutions. As discussed, such object detection systems may be used in human-computer interaction, photo album management, biometrics, video surveillance, automatic focus in camera imaging, image or video search and retrieval, and the like. Furthermore, the discussed systems and processes may have a relatively low memory footprint for models and for computing requirements advantageous for mobile, tablet, or deep embedded system implementations. The discussed systems and processes may also provide increased accuracy.

As compared to prior techniques, the discussed examples may provide the following advantages. For example, the process discussed herein may provide a model size (e.g., of a feature representation) of only about 100 KB (as compared to >1 MB in some prior methods) and a required computing memory of only about 1× the image size (as compared to 8× or 32× the image size in some prior methods). Furthermore, as discussed, the number of stages in the classifier cascade may be about 4 to 12 stages, with only 4 or 5 stages being needed in some implementations (as compared to up to 30 stages in some prior methods). The discussed techniques may also be suitable to fixed point operations, parallel processing, and/or single instruction multiple data (SIMD) operations, which may provide processing speeds of about 240 fps (frames per second) for VGA, 70 fps for HD, and/or 30 fps for Full-HD (as compared to 60-100 fps for VGA, 12-14 fps for HD, and 3-5 fps for Full-HD in some prior methods). Real-time operations of the discussed techniques may be attained (e.g., 15 fps on QVGA (Quarter Video Graphics Array)) on a CPU using only 400 MHz and 16 KB of cache, which may be implemented, as discussed, in mobile devices. In some examples, faster processing (e.g., about 3× to 5× faster) may be provided using execution unit (EU) implementations and/or dedicated hardware such as fixed function circuitry or the like.

Furthermore, the discussed techniques may provide enhanced or comparable accuracy as compared to prior methods. For examples, based on the University of Massachusetts Face Detection Data Set and Benchmark (UMass FDDB), the discussed techniques provided increased performance in terms of increased true positive rate and decreased false positive rate.

Figure 11:
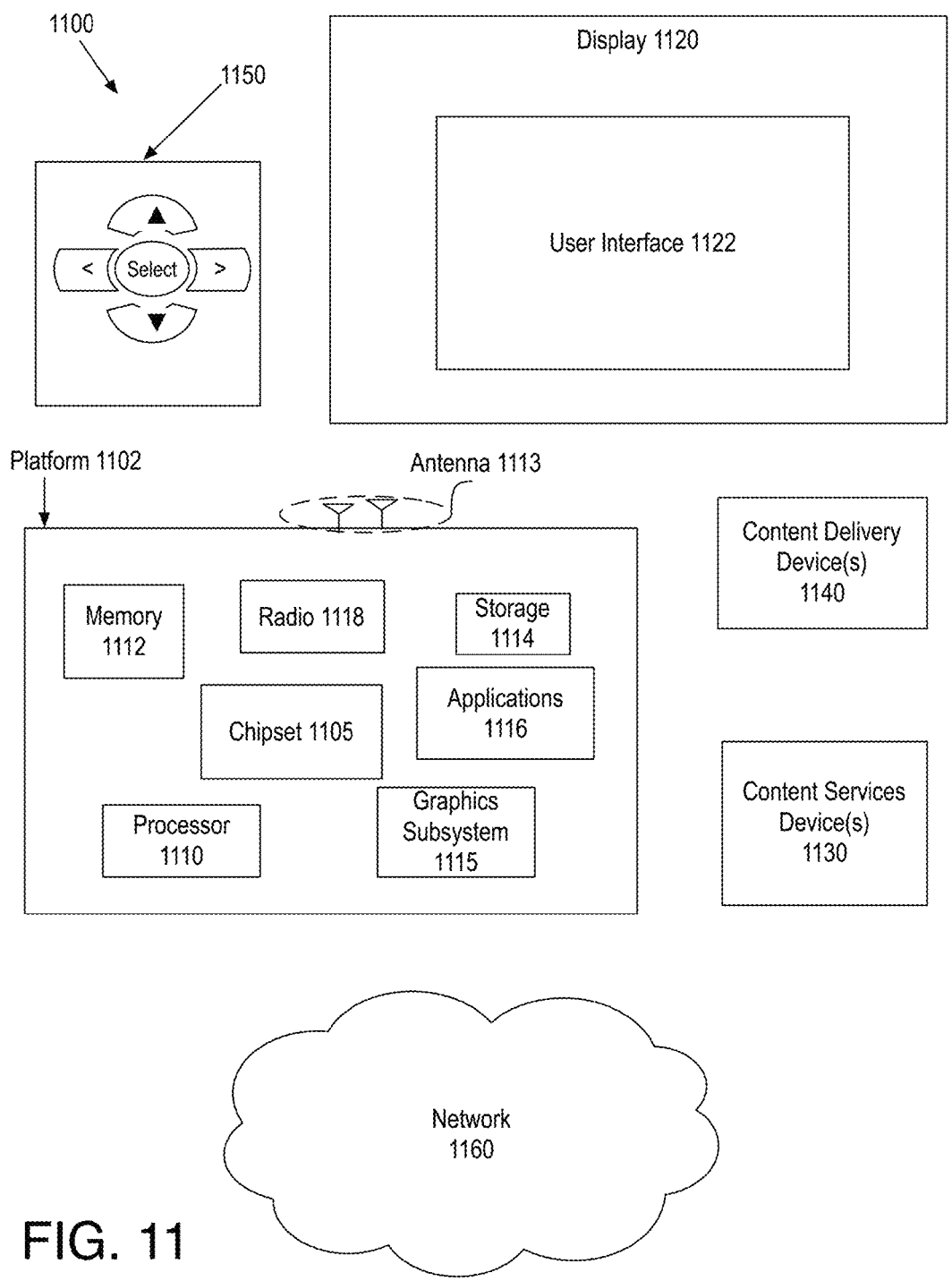
FIG. 11 is an illustrative diagram of an example system.

FIG. 11 is an illustrative diagram of an example system 1100, arranged in accordance with at least some implementations of the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
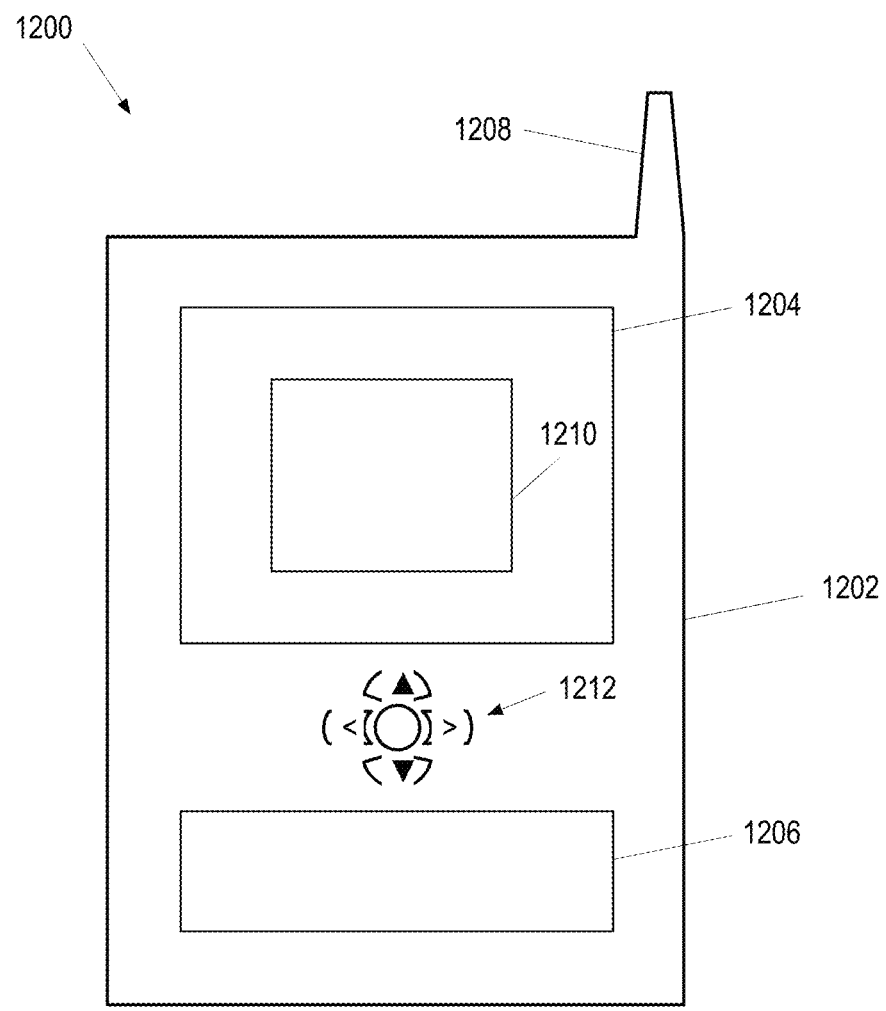
FIG. 12 illustrates an example device, all arranged in accordance with at least some implementations of the present disclosure.

As described above, system 1100 may be embodied in varying physical styles or form factors. FIG. 12 illustrates implementations of a small form factor device 1200 in which system 1200 may be embodied. In various embodiments, for example, device 1200 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing 1202, a display 1204, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for object detection comprises determining directional weighted averages for individual pixels of an input image based at least in part on pixel values of a plurality of neighbor pixels of each of the individual pixels and weights associated with locations of each of the neighbors pixels relative to the individual pixels, generating a feature representation of the input image based at least in part on the directional weighted averages, and performing object detection on the input image by applying a multi-stage cascade classifier to the feature representation.

Further to the first embodiments, the feature representation comprises a binary coded image based on the directional weighted averages and the pixel values of the plurality of neighbor pixels.

Further to the first embodiments, the feature representation comprises a binary coded image based on the directional weighted averages and the pixel values of the plurality of neighbor pixels and generating the binary coded image comprises, for a first individual pixel of the individual pixels, assigning, to each of a first plurality of neighbor pixels of the first individual pixel, a value of 0 or 1 based on a comparison of each pixel value of the first plurality of neighbor pixels to a first directional weighted average for the first individual pixel and determining a binary coded representation for the first individual pixel based on the assigned values of the first plurality of neighbor pixels.

Further to the first embodiments, the feature representation comprises a binary coded image based on the directional weighted averages and the pixel values of the plurality of neighbor pixels, generating the binary coded image comprises, for a first individual pixel of the individual pixels, assigning, to each of a first plurality of neighbor pixels of the first individual pixel, a value of 0 or 1 based on a comparison of each pixel value of the first plurality of neighbor pixels to a first directional weighted average for the first individual pixel and determining a binary coded representation for the first individual pixel based on the assigned values of the first plurality of neighbor pixels, and the value of 1 is assigned to a neighbor pixel of the first plurality of neighbor pixels if a pixel value associated with the neighbor pixel is greater than the first directional weighted average and the value of 0 is assigned otherwise, and wherein determining the binary coded representation comprises arranging the assigned values into an order based on starting at a top-left neighbor pixel of the first plurality of neighbor pixels and continuing in a clockwise manner through the first plurality of neighbor pixels.

Further to the first embodiments, determining a first directional weighted average for a first individual pixel comprises determining a first plurality of pixel values for a first plurality of neighbor pixels of the first individual pixel, wherein the first plurality of neighbor pixels are within a window around the first individual pixel, determining a first plurality of weights associated with the first plurality of neighbor pixels, and generating the first directional weighted average for the first individual pixel as a summation of the products of each of the first plurality of pixel values and each of the associated first plurality of weights divided by a summation of the first plurality of weights.

Further to the first embodiments, applying a stage of the multi-stage cascade classifier comprises determining, for a plurality of positions in a region of the input image, a summation of a plurality of differences between probabilities the positions include an object feature and probabilities the positions do not include the object feature, wherein the plurality of differences are implemented via a plurality of look up tables, and wherein the plurality of look up tables each comprise a plurality of differences, each associated with a feature representation value and comparing the summation to a predetermined threshold to determine whether to pass or fail the region.

Further to the first embodiments, implementing a stage of the multi-stage cascade classifier comprises determining, for a plurality of positions in a training set of images, a first Bayesian table having probabilities of an object feature for a range of feature representations and a second Bayesian table having probabilities of no object feature for the range of feature representations, selecting a plurality of target positions from the plurality of positions for a stage of the stage cascade classifier based on a power of each of the plurality of positions, and determining a threshold for the stage, wherein the threshold is associated with a summation of differences between probabilities the target positions include an object feature and probabilities the positions do not include the object feature.

Further to the first embodiments, the feature representation comprises a Haar-like feature representation.

Further to the first embodiments, the feature representation comprises a SURF-like feature, and wherein the multi-stage cascade classifier comprises logistic regression based classifiers.

Further to the first embodiments, the feature representation comprises at least one of a Haar-like feature representation or a SURF-like feature.

Further to the first embodiments, the method further comprises generating the input image by converting an image to gray scale and resizing the converted image based on a scaling factor, wherein performing the object detection on the input image comprises performing the object detection on a plurality of scan windows of the input image, wherein a first scan window and a second scan window pass the multi-stage cascade classifier, the method further comprising merging the first scan window and the second scan window as object candidate regions and processing the object candidate regions by at least one of saving the object candidate regions in memory or presenting the object candidate regions to a user.

In one or more second embodiments, a system for providing object detection on a computing device comprises a display device configured to present image data and a graphics processing unit coupled to the display device, wherein the graphics processing unit comprises directional weighted averages circuitry configured to determine directional weighted averages for individual pixels of an input image based at least in part on pixel values of a plurality of neighbor pixels of each of the individual pixels and weights associated with locations of each of the neighbors pixels relative to the individual pixels, feature representation circuitry configured to generate a feature representation of the input image based at least in part on the directional weighted averages, and multi-stage cascade classifier circuitry configured to perform object detection on the input image by applying a multi-stage cascade classifier to the feature representation.

Further to the second embodiments, the feature representation comprises a binary coded image based on the directional weighted averages and the pixel values of the plurality of neighbor pixels.

Further to the second embodiments, the directional weighted averages circuitry being configured to determine directional weighted averages for individual pixels of the input image comprises the directional weighted averages circuitry being configured to, for a first individual pixel, determine a first plurality of pixel values for a first plurality of neighbor pixels of the first individual pixel, wherein the first plurality of neighbor pixels are within a window around the first individual pixel, determine a first plurality of weights associated with the first plurality of neighbor pixels, and generate a first directional weighted average for the first individual pixel as a summation of the products of each of the first plurality of pixel values and each of the associated first plurality of weights divided by a summation of the first plurality of weights.

Further to the second embodiments, the directional weighted averages circuitry being configured to determine directional weighted averages for individual pixels of the input image comprises the directional weighted averages circuitry being configured to, for a first individual pixel, determine a first plurality of pixel values for a first plurality of neighbor pixels of the first individual pixel, wherein the first plurality of neighbor pixels are within a window around the first individual pixel, determine a first plurality of weights associated with the first plurality of neighbor pixels, and generate a first directional weighted average for the first individual pixel as a summation of the products of each of the first plurality of pixel values and each of the associated first plurality of weights divided by a summation of the first plurality of weights, wherein the directional weighted averages circuitry is configured to assign the value of 1 to a neighbor pixel of the first plurality of neighbor pixels if a pixel value associated with the neighbor pixel is greater than the first directional weighted average and the value of 0 otherwise, and wherein the directional weighted averages circuitry being configured to determine the binary coded representation comprises the directional weighted averages circuitry being configured to arrange the assigned values into an order based on starting at a top-left neighbor pixel of the first plurality of neighbor pixels and continuing in a clockwise manner through the first plurality of neighbor pixels.

Further to the second embodiments, the multi-stage cascade classifier circuitry being configured to perform object detection on the input image comprises the multi-stage cascade classifier circuitry being configured to, for a stage of the multi-stage cascade classifier, determine, for a plurality of positions in a region of the input image, a summation of a plurality of differences between probabilities the positions include an object feature and probabilities the positions do not include the object feature, wherein the plurality of differences are implemented via a plurality of look up tables, and wherein the plurality of look up tables each comprise a plurality of differences, each associated with a feature representation value and compare the summation to a predetermined threshold to determine whether to pass or fail the region.

Further to the second embodiments, the feature representation comprises at least one of a Haar-like feature representation or a SURF-like feature.

Further to the second embodiments, to implement a stage of the multi-stage cascade classifier, the multi-stage cascade classifier circuitry is configured to determine, for a plurality of positions in a training set of images, a first Bayesian table having probabilities of an object feature for a range of feature representations and a second Bayesian table having probabilities of no object feature for the range of feature representations, select a plurality of target positions from the plurality of positions for a stage of the stage cascade classifier based on a power of each of the plurality of positions, and determine a threshold for the stage, wherein the threshold is associated with a summation of differences between probabilities the target positions include an object feature and probabilities the positions do not include the object feature.

Further to the second embodiments, the feature representation comprises a Haar-like feature representation.

Further to the second embodiments, the feature representation comprises a SURF-like feature.

Further to the second embodiments, the system further comprises a memory configured to store the input image.

In one or more third embodiments, a system for providing object detection on a computing device comprises a display device configured to present image data and a graphics processing unit coupled to the display device, wherein the graphics processing unit comprises means for determining directional weighted averages for individual pixels of an input image based at least in part on pixel values of a plurality of neighbor pixels of each of the individual pixels and weights associated with locations of each of the neighbors pixels relative to the individual pixels, means for generating a feature representation of the input image based at least in part on the directional weighted averages, and means for performing object detection on the input image by applying a multi-stage cascade classifier to the feature representation.

Further to the third embodiments, the feature representation comprises a binary coded image based on the directional weighted averages and the pixel values of the plurality of neighbor pixels.

Further to the third embodiments, the feature representation comprises a Haar-like feature representation.

Further to the third embodiments, the feature representation comprises a SURF-like, and wherein the multi-stage cascade classifier comprises logistic regression based classifiers.

In one or more fourth embodiments, at least one machine readable medium comprises a plurality of instructions that in response to being executed on a computing device, cause the computing device to perform object detection by determining directional weighted averages for individual pixels of an input image based at least in part on pixel values of a plurality of neighbor pixels of each of the individual pixels and weights associated with locations of each of the neighbors pixels relative to the individual pixels, generating a feature representation of the input image based at least in part on the directional weighted averages, and performing object detection on the input image by applying a multi-stage cascade classifier to the feature representation.

Further to the fourth embodiments, the feature representation comprises a binary coded image based on the directional weighted averages and the pixel values of the plurality of neighbor pixels.

Further to the fourth embodiments, wherein the feature representation comprises a binary coded image based on the directional weighted averages and the pixel values of the plurality of neighbor pixels, and wherein generating the binary coded image comprises, for a first individual pixel of the individual pixels, assigning, to each of a first plurality of neighbor pixels of the first individual pixel, a value of 0 or 1 based on a comparison of each pixel value of the first plurality of neighbor pixels to a first directional weighted average for the first individual pixel and determining a binary coded representation for the first individual pixel based on the assigned values of the first plurality of neighbor pixels.

Further to the fourth embodiments, determining a first directional weighted average for a first individual pixel comprises determining a first plurality of pixel values for a first plurality of neighbor pixels of the first individual pixel, wherein the first plurality of neighbor pixels are within a window around the first individual pixel, determining a first plurality of weights associated with the first plurality of neighbor pixels, and generating the first directional weighted average for the first individual pixel as a summation of the products of each of the first plurality of pixel values and each of the associated first plurality of weights divided by a summation of the first plurality of weights.

Further to the fourth embodiments, applying a stage of the multi-stage cascade classifier comprises determining, for a plurality of positions in a region of the input image, a summation of a plurality of differences between probabilities the positions include an object feature and probabilities the positions do not include the object feature, wherein the plurality of differences are implemented via a plurality of look up tables, and wherein the plurality of look up tables each comprise a plurality of differences, each associated with a feature representation value and comparing the summation to a predetermined threshold to determine whether to pass or fail the region.

Further to the fourth embodiments, implementing a stage of the multi-stage cascade classifier comprises determining, for a plurality of positions in a training set of images, a first Bayesian table having probabilities of an object feature for a range of feature representations and a second Bayesian table having probabilities of no object feature for the range of feature representations, selecting a plurality of target positions from the plurality of positions for a stage of the stage cascade classifier based on a power of each of the plurality of positions, and determining a threshold for the stage, wherein the threshold is associated with a summation of differences between probabilities the target positions include an object feature and probabilities the positions do not include the object feature.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

It will be recognized that the invention is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. A computer-implemented method for object detection comprising:
   determining directional weighted averages for individual pixels of an input image based at least in part on pixel values of a plurality of neighbor pixels of each of the individual pixels and weights associated with locations of each of the neighbors pixels relative to the individual pixels;
   generating a binary coded image for the input image by assigning, for each of the individual pixels, the neighbor pixels thereof one of a first value or second value based on a comparison of each pixel value of the neighbor pixels to the directional weighted average of the individual pixel and determining a binary coded representation for each of the individual pixels by arranging the first or second values of the neighbor pixels thereof into an order;
   performing object detection for the input image by applying a multi-stage cascade classifier to the binary coded image.

2. The method of claim 1, wherein the first value is assigned to a neighbor pixel when a pixel value associated with the neighbor pixel is greater than the first directional weighted average and the second value is assigned otherwise, and wherein arranging the first or second values into the order comprises starting at a top-left neighbor pixel of the first plurality of neighbor pixels and continuing in a clockwise manner through the first plurality of neighbor pixels.

3. The method of claim 2, wherein the neighbor pixels are arranged at corners of and centered along edges of a 5×5 pixel window around each of the individual pixels or in a diamond pattern around each of the individual pixels.

4. The method of claim 3, wherein the first value is 1 and the second value is 0.

5. The method of claim 1, wherein determining a first directional weighted average for a first individual pixel comprises:
   determining a first plurality of pixel values for a first plurality of neighbor pixels of the first individual pixel, wherein the first plurality of neighbor pixels are within a window around the first individual pixel;
   determining a first plurality of weights associated with the first plurality of neighbor pixels; and
   generating the first directional weighted average for the first individual pixel as a summation of the products of each of the first plurality of pixel values and each of the associated first plurality of weights divided by a summation of the first plurality of weights.

6. The method of claim 1, wherein applying a stage of the multi-stage cascade classifier comprises:

determining, for a plurality of positions in a region of the input image, a summation of a plurality of differences between probabilities the positions include an object feature and probabilities the positions do not include the object feature, wherein the plurality of differences are implemented via a plurality of look up tables, and wherein the plurality of look up tables each comprise a plurality of differences, each associated with a feature representation value; and comparing the summation to a predetermined threshold to determine whether to pass or fail the region.

7. The method of claim 1, wherein implementing a stage of the multi-stage cascade classifier comprises:

determining, for a plurality of positions in a training set of images, a first Bayesian table having probabilities of an object feature for a range of feature representations and a second Bayesian table having probabilities of no object feature for the range of feature representations;

selecting a plurality of target positions from the plurality of positions for a stage of the stage cascade classifier based on a power of each of the plurality of positions; and determining a threshold for the stage, wherein the threshold is associated with a summation of differences between probabilities the target positions include an object feature and probabilities the positions do not include the object feature.

8. The method of claim 1, further comprising:

generating the input image by converting an image to gray scale and resizing the converted image based on a scaling factor, wherein performing the object detection on the input image comprises performing the object detection on a plurality of scan windows of the input image, wherein a first scan window and a second scan window pass the multi-stage cascade classifier, the method further comprising:

merging the first scan window and the second scan window as object candidate regions; and processing the object candidate regions by at least one of saving the object candidate regions in memory or presenting the object candidate regions to a user.

9. A system for providing object detection on a computing device, comprising:

a display device configured to present image data; and a graphics processing unit coupled to the display device, the graphics processing unit to:

determine directional weighted averages for individual pixels of an input image based at least in part on pixel values of a plurality of neighbor pixels of each of the individual pixels and weights associated with locations of each of the neighbors pixels relative to the individual pixels;

generate a binary coded image for the input image by assignment, for each of the individual pixels, the neighbor pixels thereof one of a first value or second value based on a comparison of each pixel value of the neighbor pixels to the directional weighted average of the individual pixel and determination of a binary coded representation for each of the individual pixels by arrangement of the first or second values of the neighbor pixels thereof into an order; and perform object detection for the input image by applying a multi-stage cascade classifier to the binary coded image.

10. The system of claim 9, wherein the first value is assigned to a neighbor pixel when a pixel value associated with the neighbor pixel is greater than the first directional weighted average and the second value is assigned otherwise, and wherein arrangement of the first or second values into the order comprises starting at a top-left neighbor pixel of the first plurality of neighbor pixels and continuing in a clockwise manner through the first plurality of neighbor pixels.

11. The system of claim 9, wherein the graphics processing unit to determine directional weighted averages for individual pixels of the input image comprises the graphics processing unit to, for a first individual pixel:

determine a first plurality of pixel values for a first plurality of neighbor pixels of the first individual pixel, wherein the first plurality of neighbor pixels are within a window around the first individual pixel;

determine a first plurality of weights associated with the first plurality of neighbor pixels; and generate a first directional weighted average for the first individual pixel as a summation of the products of each of the first plurality of pixel values and each of the associated first plurality of weights divided by a summation of the first plurality of weights.

12. The system of claim 9, wherein the graphics processing unit to perform object detection for the input image comprises the graphics processing unit, for a stage of the multi-stage cascade classifier:

determine, for a plurality of positions in a region of the input image, a summation of a plurality of differences between probabilities the positions include an object feature and probabilities the positions do not include the object feature, wherein the plurality of differences are implemented via a plurality of look up tables, and wherein the plurality of look up tables each comprise a plurality of differences, each associated with a feature representation value; and compare the summation to a predetermined threshold to determine whether to pass or fail the region.

13. The system of claim 9, further comprising:

a memory configured to store the input image.

14. At least one machine readable medium comprising a plurality of instructions that in response to being executed on a computing device, cause the computing device to perform object detection by:

determining directional weighted averages for individual pixels of an input image based at least in part on pixel values of a plurality of neighbor pixels of each of the individual pixels and weights associated with locations of each of the neighbors pixels relative to the individual pixels;

generating a binary coded image for the input image by assigning, for each of the individual pixels, the neighbor pixels thereof one of a first value or second value based on a comparison of each pixel value of the neighbor pixels to the directional weighted average of the individual pixel and determining a binary coded representation for each of the individual pixels by arranging the first or second values of the neighbor pixels thereof into an order;

performing object detection for the input image by applying a multi-stage cascade classifier to the binary coded image.

15. The machine readable medium of claim 14, wherein the first value is assigned to a neighbor pixel when a pixel value associated with the neighbor pixel is greater than the first directional weighted average and the second value is assigned otherwise, and wherein arranging the first or second values into the order comprises starting at a top-left neighbor pixel of the first plurality of neighbor pixels and continuing in a clockwise manner through the first plurality of neighbor pixels.

16. The machine readable medium of claim 14, wherein the neighbor pixels are arranged at corners of and centered along edges of a 5×5 pixel window around each of the individual pixels or in a diamond pattern around each of the individual pixels, the first value is 1, and the second value is 0.

17. The machine readable medium of claim 14, wherein determining a first directional weighted average for a first individual pixel comprises:
  determining a first plurality of pixel values for a first plurality of neighbor pixels of the first individual pixel, wherein the first plurality of neighbor pixels are within a window around the first individual pixel;
  determining a first plurality of weights associated with the first plurality of neighbor pixels; and
  generating the first directional weighted average for the first individual pixel as a summation of the products of each of the first plurality of pixel values and each of the associated first plurality of weights divided by a summation of the first plurality of weights.

18. The machine readable medium of claim 14, wherein applying a stage of the multi-stage cascade classifier comprises:
  determining, for a plurality of positions in a region of the input image, a summation of a plurality of differences between probabilities the positions include an object feature and probabilities the positions do not include the object feature, wherein the plurality of differences are implemented via a plurality of look up tables, and wherein the plurality of look up tables each comprise a plurality of differences, each associated with a feature representation value; and
  comparing the summation to a predetermined threshold to determine whether to pass or fail the region.

19. The machine readable medium of claim 14, wherein implementing a stage of the multi-stage cascade classifier comprises:
  determining, for a plurality of positions in a training set of images, a first Bayesian table having probabilities of an object feature for a range of feature representations and a second Bayesian table having probabilities of no object feature for the range of feature representations;
  selecting a plurality of target positions from the plurality of positions for a stage of the stage cascade classifier based on a power of each of the plurality of positions; and
  determining a threshold for the stage, wherein the threshold is associated with a summation of differences between probabilities the target positions include an object feature and probabilities the positions do not include the object feature.

* * * * *